UNITED STATES PATENT OFFICE.

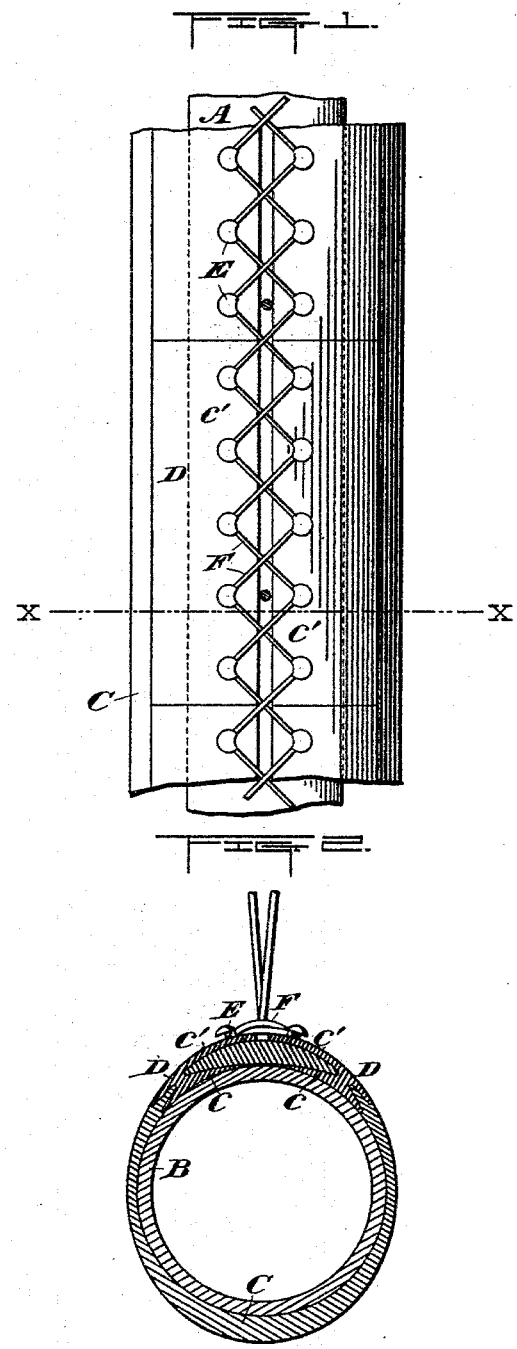

JOHN J. FOX, OF NEW YORK, N. Y.

PNEUMATIC TIRE.

SPECIFICATION forming part of Letters Patent No. 515,908, dated March 6, 1894.

Application filed August 19, 1893. Serial No. 483,545. (No model.)

*To all whom it may concern:*

Be it known that I, JOHN J. FOX, of New York, in the county and State of New York, have invented a new and useful Improvement in Tires, of which the following is a specification.

My invention is an improvement in tires and relates more particularly to that class known as pneumatic tires in which there is an inner or air tube, adapted to be inflated, and an outer cover, which serves as the tread of the tire and also as a protector for the inner tube.

One object of my invention is to secure the inner or air tube to the rim of the wheel by means of the outer protecting cover in such a manner as to prevent the lateral displacement of the tire.

A further object is to provide a tire which may be quickly removed from or attached to the rim when for any cause it is desired to do so.

A practical embodiment of my invention is represented in the accompanying drawings in which—

Figure 1 is a view of a portion of the back or inner face of the rim of a wheel, showing the manner of attaching the tire thereto, and Fig. 2 is a cross section through the tire on the line $x$, $x$ of Fig. 1.

A designates the rim of a wheel and it may be solid metal as shown, or it may be hollow, as desired. An inner or air tube B extends along the rim A, the said tube being inflated through a suitable valve, not shown. The air tube is secured to the rim by means of a cover or protector C of any suitable material which surrounds the air tube and serves as the tread of the wheel. The tread portion of the protector C is preferably thickened so as to form a better wearing surface and more fully protect the air tube from puncture. The edges of the protector C are formed of some rigid material, such for example as metal. In the present instance I have shown the edges as formed of a number of metal pieces D, permanently secured to the flexible portion of the protector along its entire length so that a portion of the protector may be removed without disturbing the rest, if so desired. The edges of the protector are bifurcated to form rigid branches to embrace the edges of the rim A. The inner branches $c$ extend toward each other along the front of the rim and the branches $c'$ extend toward each other along the back of the rim, as clearly indicated in the drawings. I have shown lacing hooks E, secured to the branches $c'$ along the edges of the protector, but eyelets may be used instead of hooks, if so desired. A lacing cord F of leather or other suitable material engages the eyelets or hooks for the purpose of drawing the edges of the protector together. In practice, I find it convenient to use several of the cords on one wheel so that the whole protector need not be unlaced to get at one particular portion of the inner tube, to mend it, for example.

In operation, when it is desired to secure the tire to the rim of a wheel, the inner tube is placed along the rim and the protector is placed around the inner tube, the branches $c$ of the edges of the protector being caused to extend along the front of the rim, and the branches $c'$ extending along the back of the rim. The lacing cords F are then drawn up very tight, so as to cause the rim to be firmly held between the branches of the bifurcated edges. By this means the tire is held securely onto the rim, yet it may be readily removed by simply unlacing the lacing cords F.

By my improvement, pneumatic tires of various sizes may be easily attached to the rim of a wheel without changing the rim in the slightest degree, and it also does not require a rim of special construction but may be applied firmly to the rims now in use.

By bifurcating the edges of the protector and causing the branches to engage the front and back of the rim, the tire is effectually prevented from slipping or shifting its position.

It is evident that slight changes might be resorted to in the arrangement and construction of the several parts without departing from the spirit and scope of my invention, hence I do not wish to limit myself strictly to the construction herein set forth, but

What I claim is—

The combination with the rim of a wheel, of a tire comprising an inner or air tube and a flexible outer cover or protector having rigid bi-furcated edge pieces fixed to its opposite edges for embracing the opposite edges of the rim, and means for removably securing the cover or protector to the rim, substantially as set forth.

JOHN J. FOX.

Witnesses:
FREDK. HAYNES,
L. M. EGBERT.